US007873744B2

(12) United States Patent
Chen et al.

(10) Patent No.: US 7,873,744 B2
(45) Date of Patent: *Jan. 18, 2011

(54) CONFIGURATION OF FIBRE CHANNEL SAN PATH

(75) Inventors: James C. Chen, Tucson, AZ (US); Patricia C. Lu, Fremont, CA (US); Chung M. Fung, San Francisco, CA (US); Minh-Ngoc L. Huynh, San Jose, CA (US); Christopher M. Sansone, Tucson, AZ (US); Dung N. Dang, Tucson, AZ (US); Gail A. Spear, Tucson, AZ (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 12/117,112

(22) Filed: May 8, 2008

(65) Prior Publication Data
US 2008/0205299 A1 Aug. 28, 2008

Related U.S. Application Data

(63) Continuation of application No. 10/719,179, filed on Nov. 20, 2003, now Pat. No. 7,523,207.

(51) Int. Cl.
*G06F 15/00* (2006.01)
(52) U.S. Cl. .................. 709/245; 709/224; 709/227; 370/255
(58) Field of Classification Search ........... 709/245, 709/224, 227; 370/255
See application file for complete search history.

(56) References Cited

U.S. PATENT DOCUMENTS 5,954,796 A 9/1999 McCarty et al.

(Continued)

FOREIGN PATENT DOCUMENTS

JP 10164117 6/1998

*Primary Examiner*—Kevin Bates
(74) *Attorney, Agent, or Firm*—Dan Shifrin

(57) ABSTRACT

System and computer program product are provided to configure a path between nodes through a fabric in a fibre channel storage area network (SAN). A node name is provided for a target node on the SAN and a port name is provided for each port in the target node. A relationship is established in a data structure between each port name and a slot in which each port is physically located in the target node. Prior to configuring a path between a source node and a port in the target node, the ports which are physically connected and logged in to the fabric are identified by port address. The port names corresponding to the port addresses are then identified. The port names are used to generate interface_ids of the ports corresponding to the physical slots in which the ports are located. A data structure is created to maintain the relationship between interface_ids and port names. To establish a path connection between a port in the source node and a selected port in the target node, the node name of the target node and the interface_id of the selected port are input to the data structure and the port name of the selected port is output. The port name is then used to obtain the address of the selected port and an I/O session path opened between the source and target nodes.

11 Claims, 2 Drawing Sheets

U.S. PATENT DOCUMENTS

| | | |
|---|---|---|
| 6,138,161 A | 10/2000 | Reynolds et al. |
| 6,208,644 B1 | 3/2001 | Pannell et al. |
| 6,587,462 B2 | 7/2003 | Mahalingaiah |
| 6,792,479 B2 | 9/2004 | Allen et al. |
| 7,200,144 B2 * | 4/2007 | Terrell et al. ............... 370/389 |
| 7,200,646 B2 | 4/2007 | Shanthaveeraiah et al. |
| 7,370,078 B1 * | 5/2008 | Woodruff ................... 709/205 |
| 7,523,207 B2 * | 4/2009 | Chen et al. .................. 709/227 |
| 7,577,726 B1 * | 8/2009 | Conard et al. ............... 709/221 |
| 2002/0049859 A1 | 4/2002 | Bruckert et al. |
| 2003/0084219 A1 | 5/2003 | Yao et al. |
| 2003/0137987 A1 * | 7/2003 | Beer et al. ................... 370/453 |
| 2004/0006612 A1 | 1/2004 | Jibbe et al. |
| 2005/0010688 A1 | 1/2005 | Murakami et al. |

* cited by examiner

CONFIGURATION OF FIBRE CHANNEL SAN PATH

TECHNICAL FIELD

The present invention relates generally to fibre channel storage area networks and, in particular, to configuring a path between a port in a source node and a port in a target node.

BACKGROUND ART

A storage area network ("SAN") permits the distribution of components, such as servers, storage devices and storage controllers, to provide a customer with access to a large storage pool. FIG. 1 is a block diagram of a generic SAN 100. Controllers 102 may be shared among multiple servers 104. In one type of SAN, the components are interconnected using the Fibre Channel protocol. The components (also referred to as nodes) may be interconnected directly (a point-to-point topology), in a ring (an arbitrated loop topology) or through switches (a switched fabric topology). The term "switch" is used herein generically to refer to switches, directors, hubs, bridges and the like. Using switches, data may be delivered across the fabric 106 from any source (or initiator) node to any destination (or target) node.

Each node is given a unique 8-byte address (a "world wide node name" or WWNN) which is assigned by the manufacturer in accordance with an established IEEE standard. Each port in a node is also given a unique 8-byte address (a "world wide port name" or WWPN) by the manufacturer.

In part to reduce the space in a channel frame header required to address a particular port and thus speed up routing of data, another port addressing scheme was developed. After a connection has been established between a node and a switch, each port in the node is assigned a unique (within the fabric) address (destination_id) by a controlling switch using a name server. The switch maintains a translation between the port address and the WWPN address and can address any port in the fabric using the destination_id. Additionally, each slot of a node has a "name" (interface_id) by which the slot may be physically identified.

However, because there may be no correlation between a port address and the physical slot location of the port, a human administrator may find it difficult to determine to which port of a node a cable should be connected. Consequently, a need exists for easily determining which physical slot on a node corresponds with a port address.

SUMMARY OF THE INVENTION

The present invention provides method, system and computer program product to configure a path between nodes through a fabric in a fibre channel storage area network (SAN). A node name is provided for a target node on the SAN and a port name is provided for each port in the target node. A relationship is established in a data structure between each port name and a slot in which each port is physically located in the target node. Prior to configuring a path between a source node and a port in the target node, the ports which are physically connected and logged in to the fabric are identified by port address. The port names corresponding to the port addresses are then identified. The port names are used to generate interface_ids of the ports corresponding to the physical slots in which the ports are located. A data structure is created to maintain the relationship between interface_ids and port names. To establish a path connection between a port in the source node and a selected port in the target node, the node name of the target node and the interface_id of the selected port are input to the data structure and the port name of the selected port is output. The port name is then used to obtain the address of the selected port and an I/O session path opened between the source and target nodes.

The name of the target node may comprise the world wide node name of the node and name of the selected port may comprise the world wide port name of the port. The address of the selected port may be the destination_id of the port, assigned by a name server on the fabric.

DETAILED DESCRIPTION OF THE PREFERRED EMBODIMENT

Figure 1:
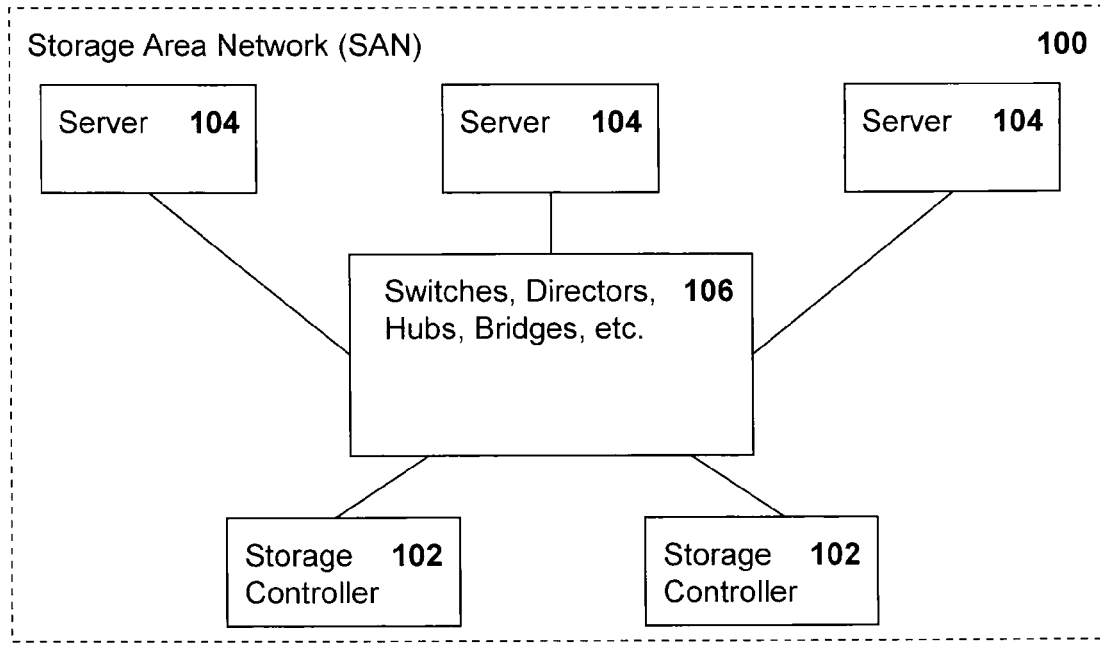
FIG. 1 is a block diagram of a generic storage area network.
Figure 2:
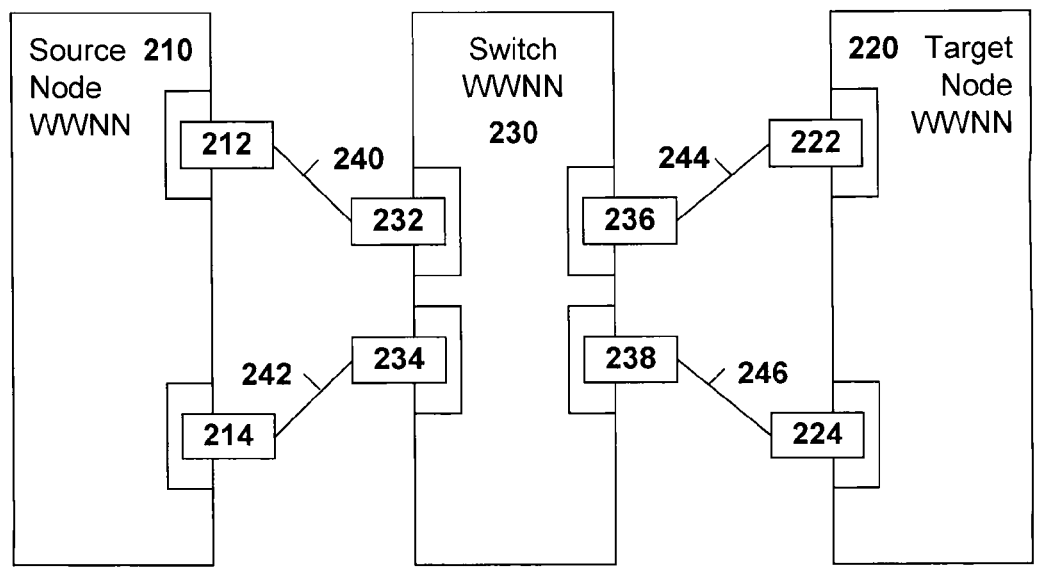
FIG. 2 is a block diagram of a portion of a storage area network in which the present invention may be implemented.

FIG. 2 is a block diagram of a portion 200 of a storage area network in which the present invention may be implemented. A source or initiator node 210 and a destination or target node 220 are coupled through a switch 230. For example, in a peer-to-peer remote copy (PRPC) environment, the source node 210 may be a primary storage controller and the target node 220 may be a secondary storage controller. Each of the components 210, 220 and 230 has a manufacturer-assigned unique world wide node name (WWNN). The source node 210 includes two ports 212 and 214; the target node includes two ports 222 and 224; and the switch 230 includes four ports 232, 234, 236 and 238. Each of the ports 212, 214, 222, 224, 232, 234, 236 and 238 has a manufacturer-assigned unique world wide port name (WWPN). As will be appreciated, nodes may include more ports than are illustrated. Channel links 240, 242, 244 and 246 interconnect the ports. Additionally, each port 212, 214, 222 and 224 in the two nodes 210 and 220 is physically located in a slot in a node and has a switch-assigned destination_id.

Figure 3:
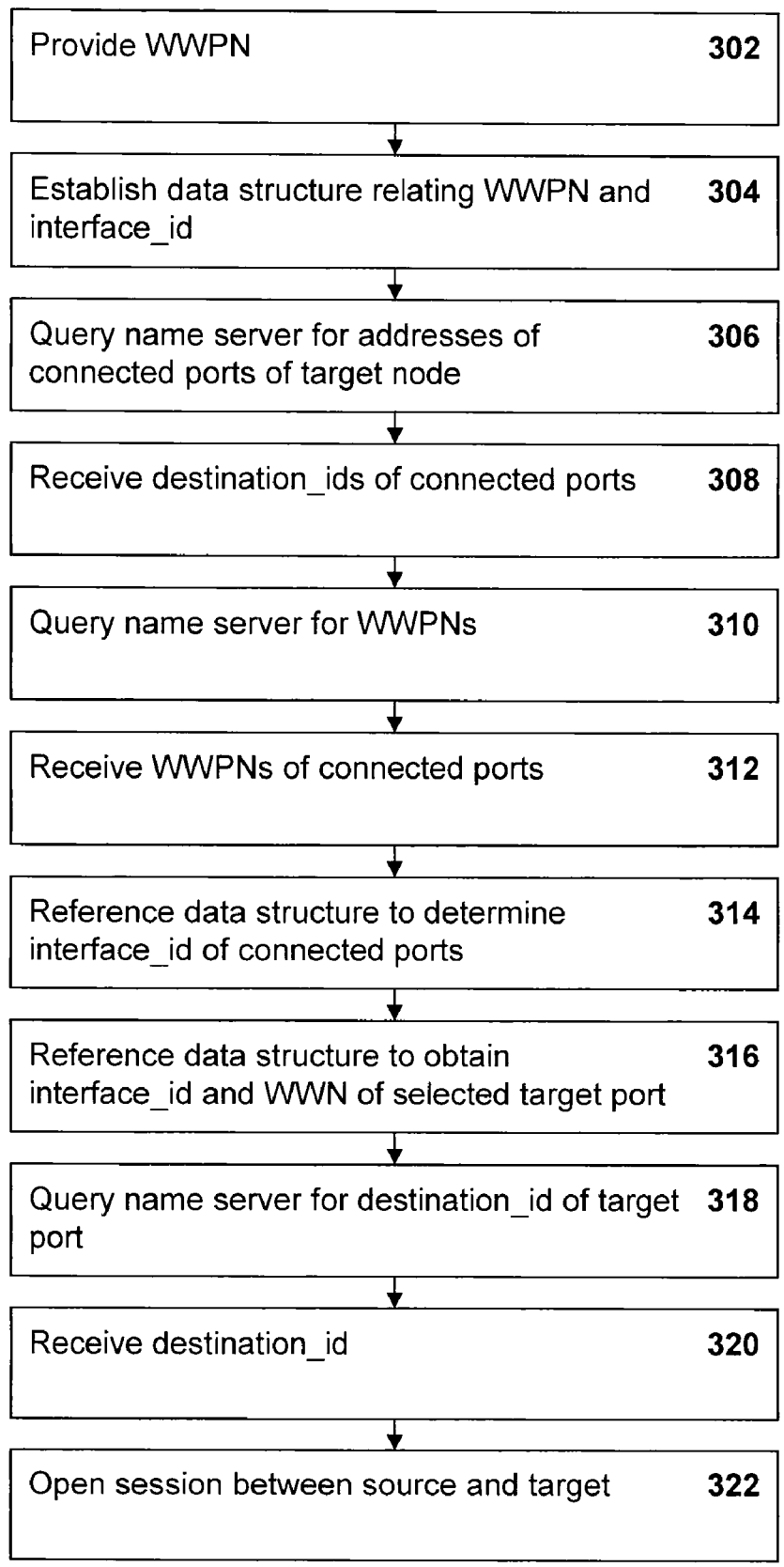
FIG. 3 is a flow chart of an embodiment of the present invention.

A user attempting to physically connect two of the components, for example the source node 210 with the switch 230, needs to know the slot number of each of the ports on the components. Referring to the flow chart of FIG. 3, in accordance with the present invention, one of the bytes of the WWNN of one of the components (for example, the source node 210) is modified to indicate the slot number in which the connected port is located to provide the WWPN (step 302). In certain storage controllers manufactured by IBM®, byte 5 of the WWNN is set to a value of C0. The slot number will replace this value. For example, if the port is located in slot number 3, byte 5 of the WWNN will be changed from C0 to C3 to thus generate the WWPN.

Next, a data structure, such as a table or algorithm, is created and stored. The data structure links or cross-references the interface_id of the slot in which a port is located with the WWPN of the port (step 304). In this manner, a relationship is established between the WWPN and the physical slot (designated by the interface_id).

In order to establish a link between two nodes, it is necessary for the source node to first identify which ports of the target node 220 are logged into the fabric; that is, to determine what physical connections exist between the two nodes. The source node 210 uses a name server on the switch 230 to transmit a query onto the fabric based on the WWNNs of the source and target nodes (step 306). The source node 210 receives back a list of port addresses (destination_ids) which are physically connected to and logged in to the fabric under the specified target WWNN (step 308). In response to a further query (step 310), the name server next returns the WWPN of the connected ports (step 312). Referencing the data structure, the interface_id of each connected port (on the target node) is determined (step 314).

When it is desired to establish a path from the source node 210 to the target node 220, the source node 210 again accesses the data structure to cross reference the interface_id and WWNN of the selected target port to determine the WWPN (step 316). Using the WWPN, the source node 210 queries the fabric to obtain the actual port address (destination_d) of the target port (step 318). The returned port address (step 320) is then used to perform a logon and a session is opened for I/O activities between the source 210 and target 220 nodes (step 322).

In the event that the target hardware is replaced or the configuration of the SAN changes, the port name (WWPN) and/or address (destination_id) will also change. However, when the present invention is implemented, a path remains established independent of the physical changes.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A storage area network, comprising:
   a source node;
   a target node having a world wide (WWNN);
   a selected port in the target node having a port address and a world wide port name (WWPN);
   a fabric to which the source node and the target node are coupled;
   a data structure associated with the source node establishing a relationship between the WWPN of the selected port with a physical slot of the target node in which the selected port is located, the relationship comprising a byte of the WWNN of the target node being a byte indicative of a slot number of the slot in which a port is located;
   means for obtaining the address of the selected port;
   means for obtaining the WWPN of the selected port in response to the obtained port address; and
   means associated with the source node for accessing the data structure and generating the interface_id of the selected port in response to the obtained WWPN.

2. The storage area network of claim 1, further comprising:
   means associated with the source node for accessing the data structure and generating the WWPN of the selected port from an input WWPN and interface_id;
   means for obtaining the address of the selected port from the generated WWPN; and
   means for opening a session with the selected port in the target node in response to obtaining the port address.

3. The storage area network of claim 2, further comprising a name server, comprising:
   means for receiving a query from the source node requesting addresses of ports in the target node; and
   means for transmitting the port addresses to the source node.

4. The storage area network of claim 3, wherein the name server further comprises:

means for receiving a query from the source node requesting WWPNs corresponding to the transmitted port addresses; and
means for transmitting the WWPNs to the source node.

5. The storage area network of claim 3, wherein the name server further comprises:
   means for receiving the WWPN of the selected port and a query from the source node requesting the address of the port corresponding to the received WWPN; and
   means for transmitting the address of the selected port to the source node.

6. The storage area network of claim 2, wherein the means for obtaining the address of the selected port comprises:
   means for transmitting the WWPN of the selected port and a query to a name server on the fabric requesting the address of the port corresponding to the transmitted WWPN; and
   means for receiving the port address from the name server.

7. The storage area network of claim 1, wherein the means for obtaining the address of the selected port comprises:
   means for transmitting a query to a name server on the fabric requesting addresses of ports in the target node; and
   means for receiving the port addresses from the name server, the received port addresses including the address of the selected port.

8. The storage area network of claim 7, wherein the means for obtaining the WWPN of the selected port comprises:
   means for transmitting a query to a name server on the fabric requesting WWPNs corresponding to the received port addresses; and
   means for receiving the WWPNs from the name server, the received WWPNs including the WWPN of the selected port.

9. A computer program product of a computer readable storage medium usable with a programmable computer readable storage medium having computer-readable code embodied therein for configuring a path between nodes on a fibre channel fabric, the computer-readable code comprising instructions for:
   modifying a world wide node name (WWNN) of a target node connected to a fabric by replacing a byte of the WWNN with a byte indicative of a slot number in which a port is located to generate a world wide port name (WWPN) of each port in the target node;
   querying a name server for addresses of ports of the target node;
   receiving the addresses of connected ports;
   querying the name server for WWPNs corresponding to the received addresses;
   receiving the WWPN of each connected port; and
   determining an interface_id of the connected ports, the interface_id corresponding to the slot number of the target node in which the port is located.

10. The program product of claim 9, further comprising instructions for:
    from the WWNN of a target node and the determined interface_id of a selected port, obtaining the WWPN of the selected port;
    querying the name server with the WWPN of the selected port;
    receiving the address of the selected port; and
    opening a session with the selected port.

11. The program product of claim 9, wherein the address is a destination_id.

* * * * *